COMPUTING MACHINE TAPES

Filed July 13, 1966

INVENTOR.
Ed N. Cullom IV

BY Hill, Sherman, Meroni, Gross & Simpson ATTORNEYS

United States Patent Office 3,409,313
Patented Nov. 5, 1968

3,409,313

COMPUTING MACHINE TAPES

Ed N. Cullom IV, Atlanta, Ga., assignor to Control Tape, Inc., Atlanta, Ga., a corporation of Georgia Filed July 13, 1966, Ser. No. 564,780
1 Claim. (Cl. 283—66)

ABSTRACT OF THE DISCLOSURE

A computing machine tape has on a longitudinal face area a plurality of longitudinally extending coextensive spaced linear segregators parallel to each other and to the longitudinal edge of the tape, and which subdivide the area into longitudinal lanes each of a width to receive as a group a predetermined number of figures of a numeral imprinted across the area and in closely columnar relation to the other numerals.

This invention relates to computing machine tapes, and is more particularly concerned with the provision on such tapes of means to facilitate reading of the transverse rows of columnar figures.

As the need for accounting procedures has proliferated as a result of business, industrial, service and governmental expansion, there has been corresponding increase in the use of various types of computing machines utilizing paper tape on which are printed successive transverse rows of related figures in columnar alignment. Cash registers, adding machines, calculators, and the like, are included in this type of machine.

Customarily commas, points (periods), differentiated spacing, or the like, have been employed to distinguish the groups of figures in the transverse rows according to decimals (cents), hundreds, thousands, millions, etc. In a single horizontal row of figures the conventional interposed distinguishing marks or spaces make such a row of figures relatively easy to read. In a column of figures, however, the distinguishing marks or spaces become relatively subordinated in the mass of figures, requiring undue concentration on the part of a person reading the figures, leading to strain and fatigue and undue liability to error.

It is, accordingly, an important object of the present invention to provide novel means to facilitate rapid and easy accurate reading of rows of figures in columnar alignment on computing machine tape.

Another object of the invention is to provide simple, inexpensive means on computing machine tape for segregating the figures of rows of figures in columnar arrangement on computing machine tape, for ease and accuracy in reading.

A further object of the invention is to provide a preprinted tape for computing machine use having thereon, longitudinal face area which is segregated into lanes to receive and differentiate desirable subdivisions of horizontal rows of figures to facilitate rapid and easy accurate reading of the figure rows when disposed in columnar alignment with other related rows of figures.

Other objects, features and advantages of the present invention will be readily apparent from the following detailed description of certain preferred embodiments thereof taken in conjunction with the accompanying drawing, in which.

Figures 1, 2, 3, 4:
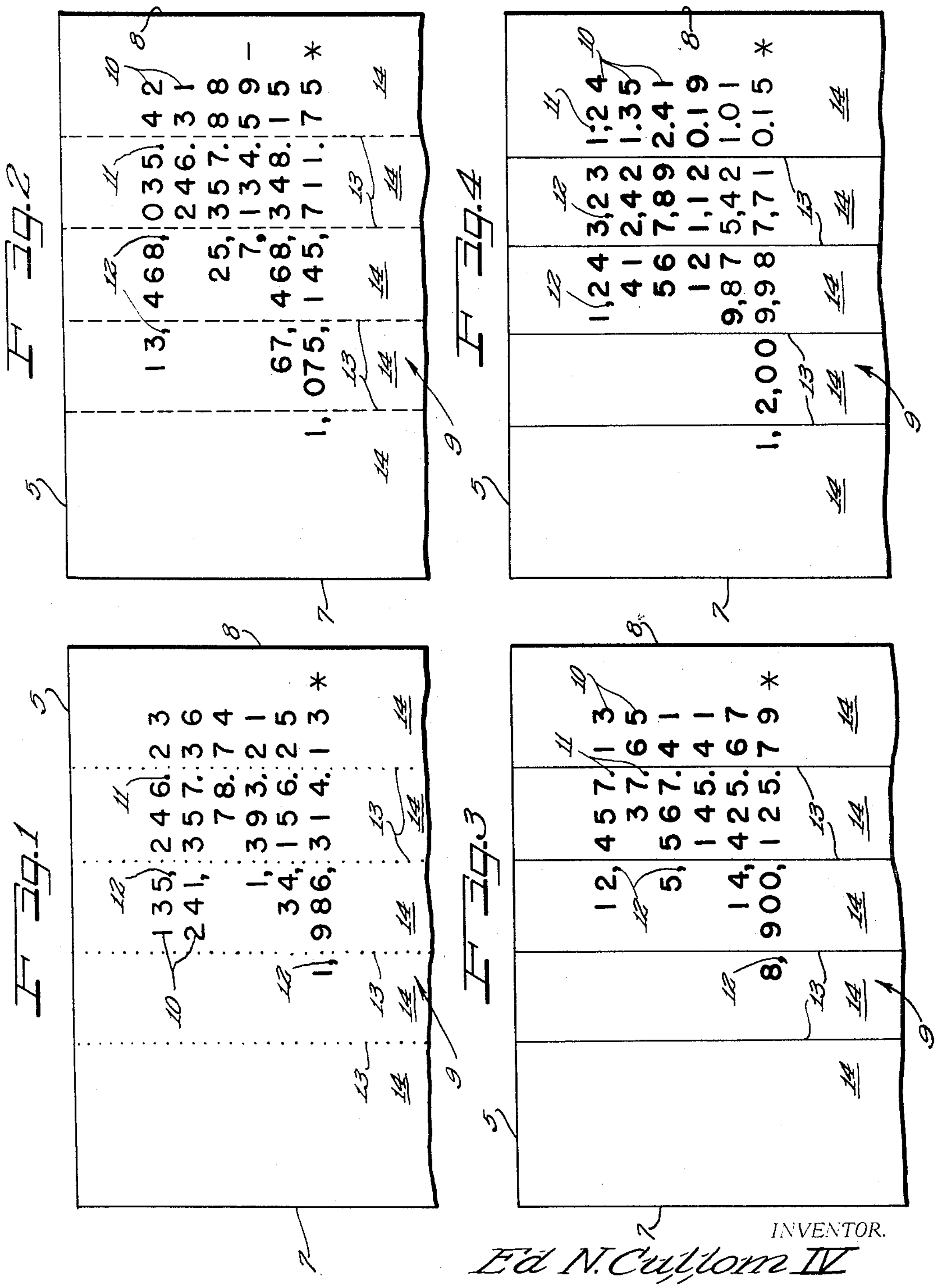
FIGURE 1 is a plan view of a computing machine tape embodying features of the invention.
FIGURE 2 is a plan view of a similar computing machine tape showing a modification.
FIGURE 3 is a similar plan view showing a further modification.
FIGURE 4 is a similar plan view showing still another modification.

In all forms of the invention a computing machine tape 5 has opposite longitudinal parallel edges 7 and 8 and a longitudinal face area 9 receptive of a series of rows of figures 10 imprinted thereon in columnar alignment by the computing machine with which the tape is associated in use. The tape 5 may, of course, be of any width or weight. It may be a strip of any desired length supplied in roll form, in fan folded form, part of a manifold assembly, or the like. It may comprise any suitable material, although paper is customary for reasons of economy.

In the illustrated examples, customary points 11 between the second and third numerals of the figures indicate the decimal or cents differentiation. Between each group of three numerals leftward therefrom the visual indicator 12 which may be in the conventional comma form differentiates the figure row into hundreds, thousands, millions, etc. Normally the face area 9 is blank and the columnar arrangement of the figures 10 with the space distinguishing marks 11 and 12 comprise the total printed array. Usually any one of the figures standing alone on the face area 9 is relatively easy to read, irrespective of the length of the figure row and the number of numeral groups distinguished by the marks 11 and 12. However, in the multiple figure, regular columnar series arrangement, the distinguishing marks 11 and 12 become, at least visually, so subordinated to the mass of numerals as to require such a degree of concentration in reading the individual figures 10 as to lead rapidly to strain and fatigue and thus loss of efficiency and time, undue liability to erroneous reading, and the like.

According to the present invention novel means are provided to facilitate rapid and easy accurate reading of the rows of figures 10 in their columnar orientation. To this end, a plurality of longitudinally extending segregators 13 are provided on the face area 9, subdividing it into respective contiguous longitudinal lanes 14 each of a width receptive of and differentiating a plurality of the columns of figures to facilitate rapid and easy accurate reading of the rows of figures. The segregators 13 are parallel to each other and to the side edges 7 and 8 of the tape 5 and desirably extend longitudinally throughout the length of the face area 9. Although the segregators may take any of numerous and varied forms, such as printed dots (FIG. 1), dash marks (FIG. 2) or straight continuous lines (FIGS. 3 and 4), the principal consideration is to provide distinct segregating differentiation between the selected columns of figures. For the usual sighted person visible differentiation is the prime requirement for the segregators 13. For a blind person the segragators 13 may be raised from the surface of the area 9 for touch sensibility. In FIGS. 1, 2 and 3, the respective segregators 13 are located to fall between the second and third, the fifth and sixth, the eighth and ninth, the eleventh and twelfth, etc., columns. That is, the segregators are, in these examples, located to receive the columns of figures in the lanes 14 in the same order as provided by the distinguishing marks 11 and 12. The quite apparent greater ease in reading the rows of figures by reason of the clear separations delineated by the segregators 13 is readily apparent from the illustrations.

While in FIGS. 1–3 the segregators 13 are disposed to facilitate reading of dollars and cents types of figures, in FIG. 4 the segregators 13 are placed on the area 9 for fast and accurate reading when statistical answers are desired. For this purpose, the segregators 13 are located to provide the lanes 14 each to receive three columns of the figures. That is the segregators are located to fall between the third and fourth columns, the sixth and seventh columns, the ninth and tenth columns, the twelfth and thirteen columns, etc.

While it is recognized that due to the great diversity in spacing, type font and other mechanical differences in various makes and models of computing machines, no one standard orientation of the segregators 13 relative to the side edges of the tape would be practical to serve all machines, the large quantities of tape used in such machines render it altogether practical to supply tapes on which the segregators 13 are printed or otherwise provided properly aligned with respect to the specific imprinting mechanisms of the intended machine or model of machines to fall between the desired columns of figures.

It will be understood that various modifications may be effected without departing from the spirit and scope of the novel concepts of this invention.

I claim as my invention:

1. In an imprinted tape for a computing machine of the cash register, adding machine, calculator, and like, type:

the tape being of a width and continuous length suitable for such a machine and having parallel opposite longitudinal edges;

a longitudinal face area of said tape having thereon closely successive numbers each comprising a straight transverse row of spaced machine imprinted figures, and with the figures of the numbers disposed in regular columns aligned longitudinally of the tape in predetermined spaced relation to the edges of the tape;

and a plurality of longitudinally extending coextensive linear segregators on and extending throughout the length of said face area;

and each of which is thin and substantially narrower than any space between figures;

the segregators being in spaced parallel relation to each other and to said edges and subdividing the area into respective contiguous longitudinal normally blank lanes of respective widths to receive and differentiate a predetermined plurality of columns of figures of said numbers as groups from the remaining columns of figures;

there being as many of said lanes as required across the width of the tape to segregate into predetermined groups of figures even the longest number that can be imprinted by said machine, the segregators being disposed between and clear of all of the figures in the columnar groups of the figures to avoid any interference with or disruption of the numbers and to facilitate rapid and easy accurate reading of the numbers.

References Cited

UNITED STATES PATENTS

| | | | |
|---|---|---|---|
| 985,994 | 3/1911 | Garbo | 283—62 |
| 2,832,611 | 4/1958 | Prosser | 283—66 |

LAWRENCE CHARLES, *Primary Examiner.*